(12) United States Patent
Huang et al.

(10) Patent No.: US 6,824,799 B1
(45) Date of Patent: Nov. 30, 2004

(54) FOOD PRODUCT WITH ENHANCED CRISPINESS

(75) Inventors: Victor T. Huang, Mounds View, MN (US); Fern Alane Panda, New Brighton, MN (US); Diane Rae Rosenwald, Plymouth, MN (US); Kamel Chida, Edina, MN (US)

(73) Assignee: General Mills, Inc., Minneapolis, MN (US)

(*) Notice: Subject to any disclaimer, the term of this patent is extended or adjusted under 35 U.S.C. 154(b) by 0 days.

(21) Appl. No.: 09/694,927

(22) Filed: Oct. 24, 2000

(51) Int. Cl.[7] .............................................. A23G 9/00
(52) U.S. Cl. ........................ 426/94; 426/100; 426/101; 426/103; 426/138; 426/139
(58) Field of Search .................... 426/103, 94, 138, 426/139, 549, 100, 101

(56) References Cited

U.S. PATENT DOCUMENTS

| | | |
|---|---|---|
| 2,167,353 A | 7/1939 | Frediani |
| 2,694,012 A | 11/1954 | Washburn |
| 2,731,349 A | 1/1956 | Toulmin, Jr. |
| 3,062,664 A | 11/1962 | Pollock |
| 3,185,574 A | 5/1965 | Gabby et al. |
| 4,172,154 A | 10/1979 | von Rymon Lipinski |
| 4,283,430 A | 8/1981 | Doster et al. |
| 4,394,392 A | 7/1983 | Tresser |
| 4,596,714 A | 6/1986 | Brabbs |
| 4,812,323 A | 3/1989 | Savage |
| 4,822,627 A | 4/1989 | Clegg et al. |
| 5,080,919 A | 1/1992 | Finley et al. |
| 5,080,920 A * | 1/1992 | Taylor et al. ................ 426/549 |
| 5,171,605 A | 12/1992 | Attenburrow et al. |
| 5,223,286 A | 6/1993 | Selbak |
| 5,304,386 A | 4/1994 | Dugas et al. |
| 5,306,513 A | 4/1994 | Colucci et al. |
| 5,336,511 A | 8/1994 | Der Beek |
| 5,789,008 A | 8/1998 | Monte |
| 6,093,437 A * | 7/2000 | Katta et al. ................ 426/553 |
| 6,217,929 B1 * | 4/2001 | Hahn .......................... 426/549 |
| 6,235,324 B1 | 5/2001 | Grigoli et al. |
| 6,235,329 B1 | 5/2001 | Grigoli et al. |

FOREIGN PATENT DOCUMENTS

| | | |
|---|---|---|
| DE | 40 23 448 A1 | 2/1992 |
| EP | 0 192 542 A2 | 8/1986 |
| FR | 2 431 258 | 2/1980 |
| JP | 03083536 | 4/1991 |
| WO | WO 99/02042 | 1/1999 |
| WO | WO 00/13512 | 3/2000 |
| WO | WO 00/19829 | 4/2000 |

OTHER PUBLICATIONS

Kulp, K. et al., "Starch Functionality in Cookie Systems," *Starch*, vol. 43, No. 2, pp. 53–57 (1991).
Livings, S.J. et al., "Ageing in Confectionary Wafers," *The Glassy State in Foods*, pp. 507–511 (1993).
Lorenz, K., "Carbohydrates in Cookies," *Cookie Chemistry and Technology* ed. Karel Kulp, The American Institute of Baking, Manhattan, Kansas, 16 pgs. (1994).
Schanot, M., "Sweeteners: Functionality in Cookies and Crackers," *Tech. Bull. Am. Inst. Baking*, vol. 3, No, 4, pp. 1–4 (1981).

* cited by examiner

*Primary Examiner*—Lien Tran
(74) *Attorney, Agent, or Firm*—Annette M. Frawley; Arlene L. Hornilla; Douglas J. Taylor

(57) ABSTRACT

A food product, such as a baked good, having either high molecular weight starch hydrolysate or a crystalline hydrate producing sugar as a sweetening agent. Preferably, the starch hydrolysate has a dextrose equivalent of about 5 to 30 DE, and the crystalline hydrate former is raffinose or trehalose. The high molecular weight starch hydrolysate, the crystalline hydrate former, or combination thereof, increases the crispiness of the product at higher moisture levels. The food product can be a baked good such as an ice cream cone, cookie, wafer, or the like.

13 Claims, 5 Drawing Sheets

Change of Modulus for Crystalline Hydrate Formers in Ice Cream Cones at Different Moisture Contents Change of Modulus in Cones with a Combination of Starch Hydrolysates (20 DE CSS) and Sucrose at Different Moistures

FOOD PRODUCT WITH ENHANCED CRISPINESS

FIELD OF THE INVENTION

The present invention relates to a food product having an increased crispiness at high moisture content. In particular, the increased crispiness is achieved by using one of a high molecular weight starch hydrolysate or a crystalline hydrate former.

BACKGROUND OF THE INVENTION

Traditionally sucrose, commonly known as "sugar" and including "brown sugar", is used as the primary, if not only, sweetening agent in food items such as baked goods including cookies, wafers, and ice cream cones. These baked goods are often in contact with liquid or in a high moisture environment. For example, many baked goods are filled or coated with high moisture containing foods, such as fruit fillings and cream fillings. Another example is ice cream; for preassembled ice cream cones, a baked cone may be in contact with the ice cream for weeks and often months. Cookies and wafers are also often used to make preassembled ice cream sandwiches. Crunchy toppings are often placed on or in high moisture foods such as yogurt, ice cream, and the like.

Although the general consumer enjoys these various food items such as preassembled ice cream treats, the baked good (cone, cookie, or the like) or topping can absorb moisture, become soggy and lose its crispiness after exposure to the ice cream. A soggy product is typically undesirable to consumers.

In an attempt to decrease the tendency to lose the crispiness, modifications can be made to the product to retain the crispiness of the baked good or other food product. In some cases, for example an ice cream cone product, a: thin moisture impermeable or resistant layer, such as chocolate, is provided on the surface in contact with the ice cream. The chocolate coating acts as a physical barrier to minimize the transfer of moisture into the cone. In other cases, fatty materials can be used to provide such a resistant layer. These layers can be provided on the baked good surface by dipping, spraying, roll coating, enrobing, and other known methods. Examples of references that have attempted to use these moisture resistant layers include U.S. Pat. Nos. 2,167,353 (Frediani), 4,394,392 (Tresser) and 5,789,008 (Monte).

However, these surface coatings are not acceptable for all food products. Other attempts have been made to improve the crispiness. For example, gluten has been added to baked goods to improve the crispiness and improve browning. However, the use of such high protein flour can lead to products that are hard and leathery at high moisture contents. Other baked goods have used other proteins instead of or in addition to the gluten. Unfortunately, high amounts of proteins can lead to off-flavors, and many proteins are too expensive to be viable in commercial applications.

Accordingly, there is a continuing need to retain crispiness and minimize soggy food products, such as baked goods.

SUMMARY OF THE INVENTION

The present invention provides a food product having a crisp texture in high moisture environments. In particular, the food product remains acceptably crisp even with moisture levels of about 9% or greater. This food product utilizes at least one of a high molecular weight starch hydrolysate or a crystalline hydrate former. Sucrose may be added in addition to the starch hydrolysate or crystalline hydrate former. In some embodiments, the food product is a bakery or baked good product.

The high molecular weight starch hydrolysate or crystalline hydrate former is present in the bakery product at a weight percent of about 10 to 45%, typically about 20 to 40%, and in some embodiments at about 30 to 40%. The bakery product can include some amount of sucrose together with the starch hydrolysate or crystalline hydrate former; in these embodiments, the total weight percentage of the starch hydrolysate or crystalline hydrate former and sucrose is about 10 to 50%. Preferably, the amount of starch hydrolysate in relation to all sweeteners in the baked product is at least 25%, preferably at least 40%, and most preferably at least 60%.

The crispiness of the food product is quantified by the Young's modulus of the product, which is the force per unit area required to break, crack or puncture the product. Generally, as the moisture content in the food product increases, the modulus decreases. The food products of the present invention: have both a high resistance to moisture absorption and a characteristic of retaining crispiness at high moisture contents.

Bakery products according to the present invention, when baked to a thickness of about 2.2 mm, generally have a modulus of at least 200 g/mm$^2$, preferably at least 300 g/mm$^2$, and most preferably at least 350 g/mm$^2$ at a moisture content of 10%. In other embodiments, the bakery products, when baked to a thickness of about 2.2 mm, have a modulus of at least 200 g/mm$^2$, preferably at least 300 g/mm$^2$, and most preferably at least 400 g/mm$^2$ at a moisture content of about 9%. Specific examples include, a bakery product of the present invention made with 20 DE corn syrup solids, having an average thickness of about 2.2 mm, has a modulus of at least about 475 g/mm$^2$ at a moisture content of 10.9%. In another embodiment, a bakery product made with trehalose, a crystalline hydrate former, has a modulus of at least about 405 g/mm$^2$ at a moisture content of 10.5%. In still another embodiment, a bakery product made from a tapioca dextrin and having an average thickness of about 2.2 mm, has a modulus of at least about 615 g/mm$^2$ at a moisture content of 10.8%. A conventional bakery product made from sucrose, has a modulus of only about 110 g/mm$^2$ at a moisture content of 10.5%.

The present invention is directed to a baked good or bakery product that has a sweetener comprising at least one of a high molecular weight starch hydrolysate and a crystalline hydrate former. The baked good is produced from a batter or dough composition comprising flour, water, and a sweetener, the sweetener comprising at least one of a high molecular weight starch hydrolysate and a crystalline hydrate former, the dough composition, which when baked to a thickness of about 2.2 mm, has a modulus of at least 300 g/mm$^2$ at a moisture content of 10%. The baked good may include additional ingredients such as shortening, emulsifiers, flavorings, colorings, and the like. In another embodiment, the present invention is directed to a baked good made from a dough composition comprising flour, water, shortening, and a sweetener, the sweetener comprising at least one of a high molecular weight starch hydrolysate and a crystalline hydrate former, the baked good, when having a thickness of about 2.2 mm, having a modulus of at least 350 g/mm$^2$ at a moisture content of 10%.

The present invention is also directed to a baked food product having a baked good comprising flour, water, and a sweetener, the sweetener comprising at least one of a high molecular weight starch hydrolysate and a crystalline hydrate former; and a high moisture food product, such as ice cream, frozen yogurt, pudding, pie filling, and the like, in contact with the baked good. The baked good can be an ice cream cone, a cookie, a wafer, a pie shell, and the like. Preferably, the baked good has a thickness of about 2.2 mm and a modulus of at least 350 g/mm² at a moisture content of 10%.

DETAILED DESCRIPTION OF THE PREFERRED EMBODIMENT

The present invention is directed to the use of high molecular weight starch hydrolysates or crystalline hydrate formers in food products, such as bakery products, where crispiness is desired in a high moisture environment. Many of these food products are packaged or assembled with liquid, frozen liquid, other filling products, or in general, with a food product having a higher moisture content than the food product of the present invention.

Figure 1:
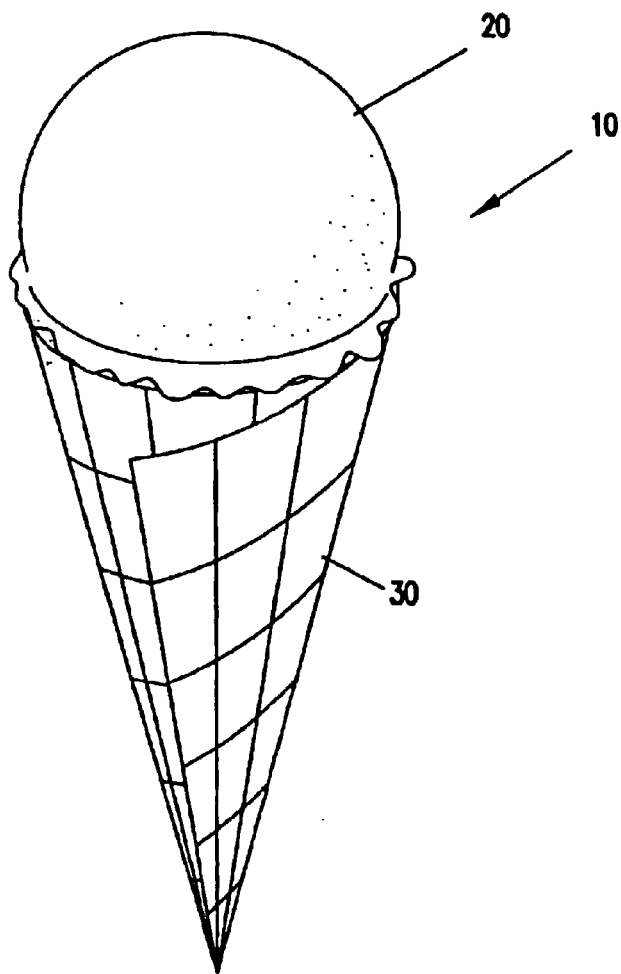
FIG. 1 is a schematic perspective side view of an ice cream cone, specifically, a waffle-type ice cream cone, according to the present invention.
Figure 2:
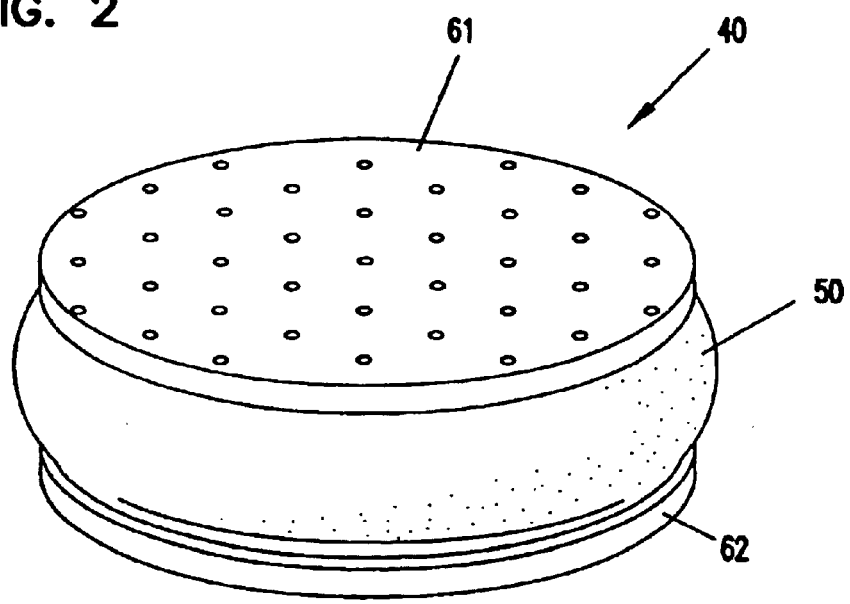
FIG. 2 is a schematic perspective top view of an ice cream sandwich according to the present invention.
Figure 3:
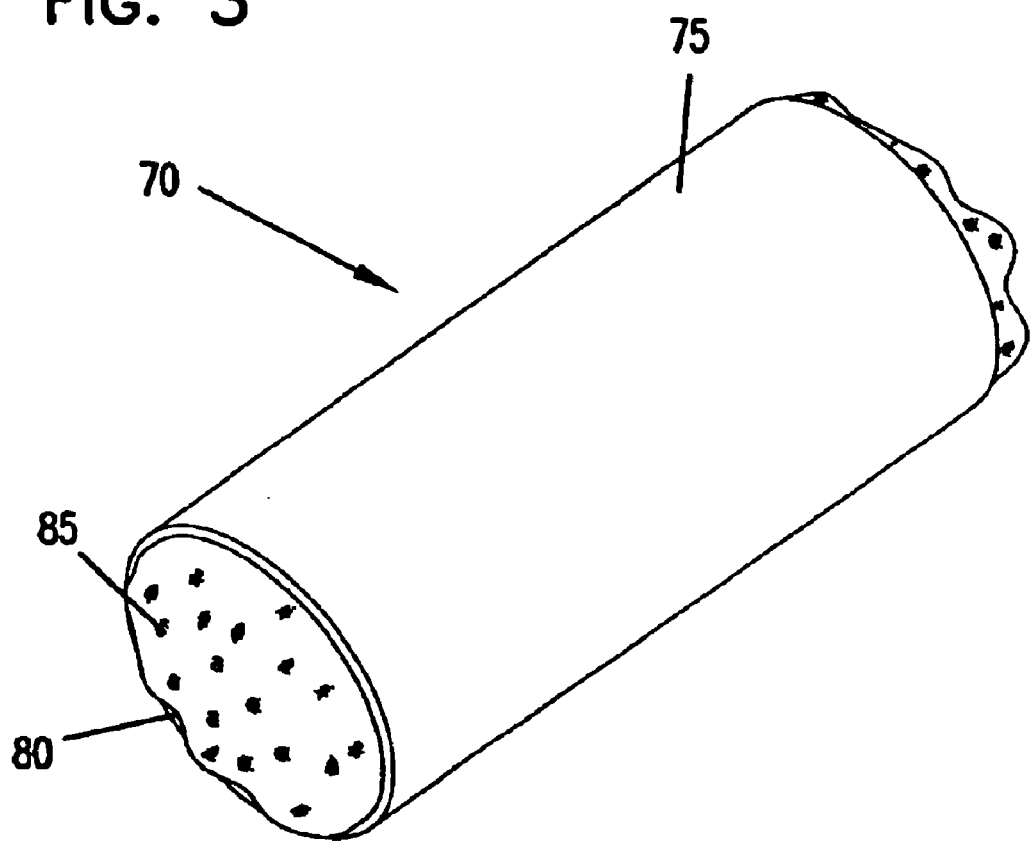
FIG. 3 is a schematic perspective side view of a filled rolled wafer, having an outer shell and crispy particles within the filling, both according to the present invention.

Referring now to FIGS. 1, 2 and 3, three products incorporating embodiments of baked goods in accordance to the present invention are shown. In FIG. 1, a waffle-type ice cream cone is shown. The ice cream cone 10 has a scoop of ice cream 20 or other frozen dessert product positioned within cone 30. Cone 30 is a waffle-type or wrapped cone that is made by wrapping a baked flat wafer into a conical shape. In other embodiments, cone 30 can be molded in a conical shape before baking. Cone 30, made in accordance with the present invention, retains its crispiness even after extended exposure to ice cream 20.

In FIG. 2, an ice cream sandwich is shown. The ice cream sandwich 40 has a layer of ice cream 50 or other frozen dessert product positioned between first cookie layer 61 and second cookie layer 62. Each of cookie layer 61, 62 can be a typical cookie, such as a chocolate chip cookie, a chocolate wafer, or another such layer. Cookie layers 61, 62, made in accordance with the present invention, retain their crispiness even after extended exposure to ice cream 50.

In FIG. 3, a rolled wafer product is shown. The rolled wafer product 70 has a wafer shell 75 that has been formed either by molding or extruding uncooked dough into a tube, or by rolling a flat sheet of uncooked or cooked dough. Wafer shell 75 is filled with a filling 80, such as crème. Additionally, within filling 80 are crispy particles 85, which are also made according to the present invention. Particles 85 are distributed throughout filling 80 so that essentially all surfaces of particles 85 are in contact with filling 80.

A baked good or bakery product in accordance to the present invention, such as cone 30, cookie layers 61, 62, or wafer shell 75 can contain either a high molecular weight starch hydrolysate or a crystalline hydrate former such as trehalose, lactose and raffinose. It is understood that the baked good of the present invention is not limited to the embodiments shown in FIGS. 1 through 3, but that a baked good of any shape or size can be made. As an example, a baked good for use with ice cream can be molded a cone, rolled cone, molded cup, flat wafer or cookie, or any product that can be a container to support ice cream. The inclusion of the high molecular weight starch hydrolysate or crystalline hydrate formers specified improves any baked good's resistance to becoming soggy in high moisture environments.

Figure 4:
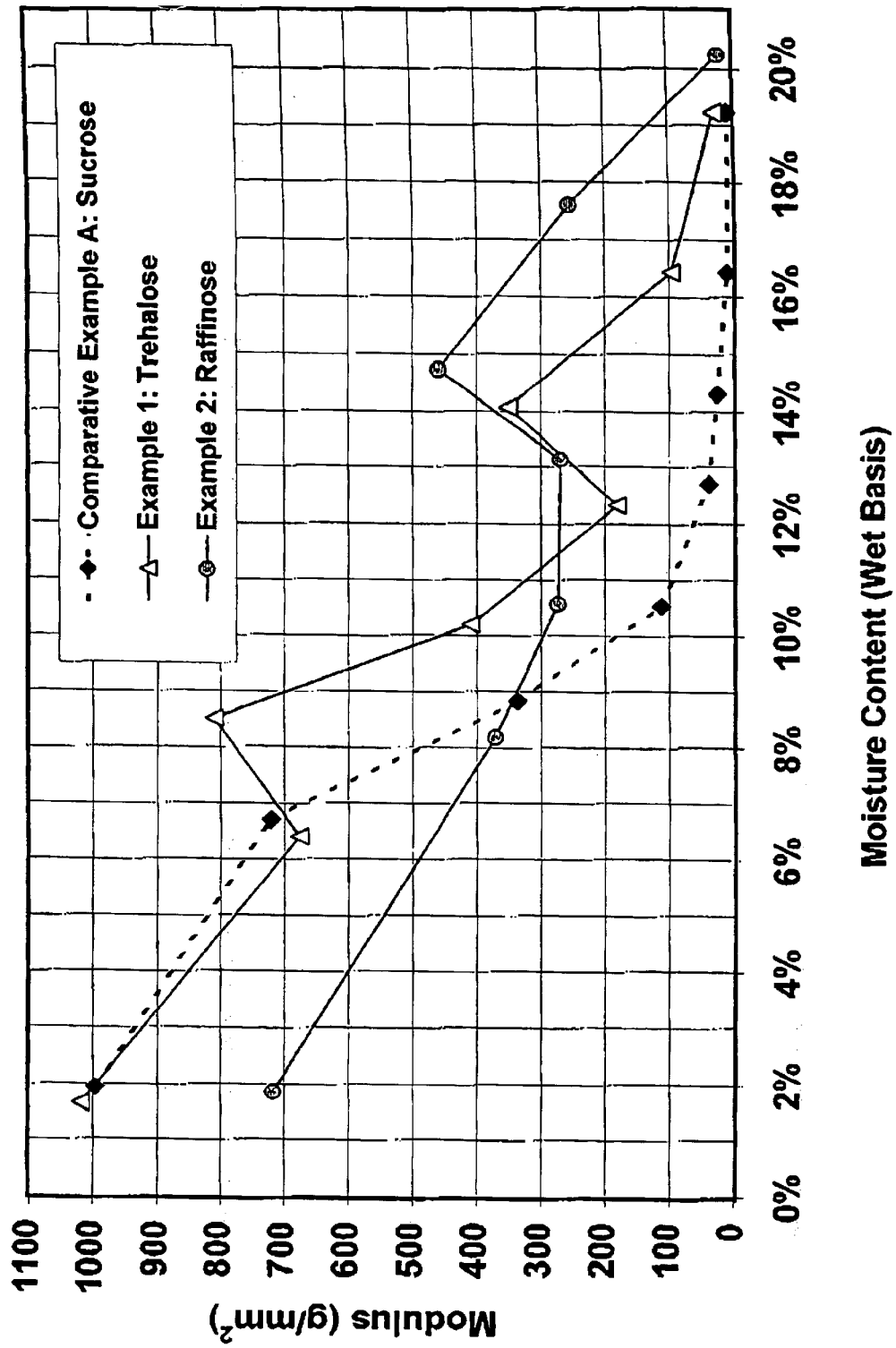
FIG. 4 is a graphical representation of the modulus of crystalline hydrate formers in respect to moisture content for Examples 1 through 4 and Comparative Example A.

Crystalline hydrate forming sugars, such as maltose, isomalt, lactose, trehalose, and raffinose, can be used in the present invention. Preferred crystalline hydrate forming materials include trehalose and raffinose. A crystalline hydrate former absorbs water from the surrounding environment and forms a hydrate. This crystalline hydrate formation takes water from the system and integrates the water in the crystalline matrix. The hydrate formed may have any structure; for example, trehalose forms a dihydrate and raffinose forms a pentahydrate. FIG. 4 shows how some crystalline hydrate formers increase crispiness, as quantified by the modulus of baked good products at higher moisture contents.

The food products according to the present invention, such as baked products such as cone 30, cookie layers 61, 62, or wafer shell 75 can additionally or alternately utilize a high molecular weight starch hydrolysate. High molecular weight starch hydrolysates are hydrolyzed starches that have a glucose backbone and are usually described by their dextrose equivalent (DE). The DE of a hydrolysis product is its reducing power as a percentage of the reducing power of pure dextrose (D-glucose). Thus, the DE of the starch hydrolysate is inversely proportionate to the molecular weight of the molecule; the DE is related to the degree of polymerization (DP) by DE=100/DP.

Starch hydrolysates are generally made by treating starch with an enzyme and/or an acid to hydrolyze the starch. Starch is a mixture of essentially linear (amylose) and branched (amylopectin) polymers of α-D-glucopyranosyl units at various ratios depending on the starch source. With acid treatment, hydrolysis of the glycosidic bonds in starch occurs more or less randomly to produce initially very large fragments. Enzymes usually are more selective of which bonds to hydrolyze. When only a few glycosidic bonds are hydrolyzed in a dry state by an acid, it is called an acid-modified starch. Acid-modified starches have a lower viscosity than native starches. The starch hydrolysate products formed by a more extensive modification with acid in a dry state are "dextrins". Dextrins retain large amounts of linear chains or long chain fragments. Hydrolysis of starch in water with either an acid or enzymes produces first maltodextrins and then corn syrup solids.

The high molecular weight starch hydrolysates generally have a low DE range, such as about 1 to 50 DE. Typically, for use in the present invention the DE of the starch hydrolysates is about 1 to 42, preferably about 5 to 30, and more preferably about 10 to 20. In one embodiment, a DE starch hydrolysate is used. In another embodiment a 20 DE starch hydrolysate, such as 20 DE corn syrup solids, is used.

Maltodextrins have a DE range of 1 to 19 and an average molecular weight from 950 to 18000. Corn syrup solids have a DE starting at 20 with an average molecular weight of 900; as the DE increases, the molecular weight decreases until the starch is broken down to glucose, which has a dextrose equivalent of 100 DE and a molecular weight of 180. Low DE maltodextrins have a higher viscosity and are less sweet than corn syrup solids or glucose.

Figure 5:
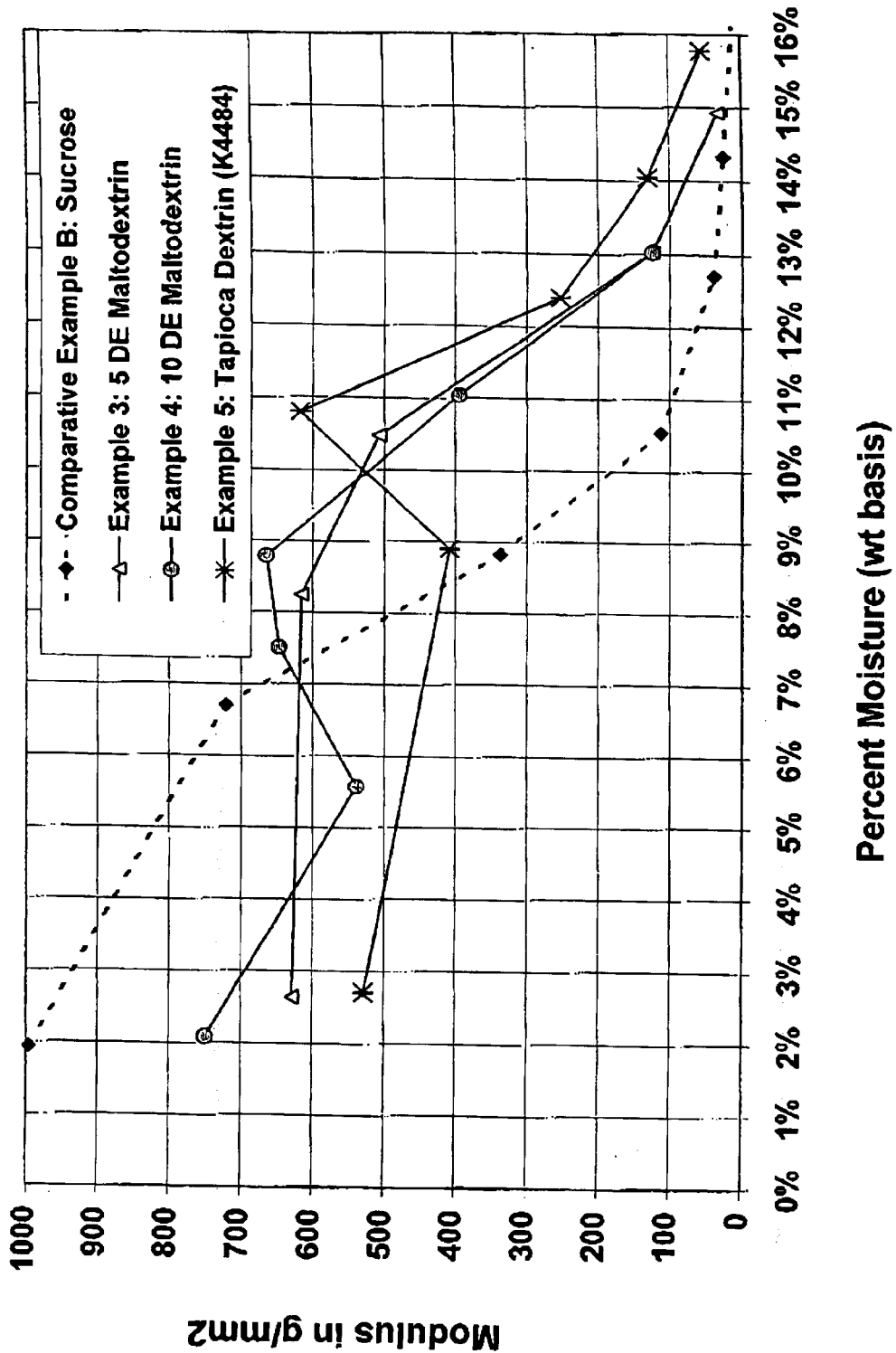
FIG. 5 is a graphical representation of the modulus of starch hydrolysate products in respect to moisture content for Examples 5 through 8 and Comparative Example B.

The inclusion of a high molecular weight hydrolysate improves the food product or baked good's resistance to becoming soggy in high moisture environments. FIG. 5 shows how some starch hydrolysate products increase crispiness as quantified by the modulus of baked good products at higher moisture contents.

The food product of the present invention is generally made with ingredients that include a sweetener. One type of food product is a baked good or bakery product. A bakery product is made from a dough or batter that includes ingredients such as flour and water, and optionally ingredients such as shortening, emulsifiers, leaveners, flavorings, colorings, and the like. A sweetener is added to the dough or batter, and in accordance with the present invention, the sweetener component includes either or both of a high molecular weight starch hydrolysate and a crystalline hydrate former.

The flour provides the structure and texture of the food product. If too much flour is used, the dough or batter may be too thick to process. Conversely, if not enough flour is used, the resulting product may have insufficient structure. Any flour, such as bleached, unbleached, whole wheat, soft wheat, hard wheat, corn flour, and the like, can be used. The amount of flour in the batter or dough product is generally at least about 30% by weight, and generally less than about 70%.

Proteins, such as milk proteins, wheat gluten proteins, and vegetable proteins, such as soy protein, can also be added. Other examples of proteins include egg albumen, sodium caseinate, and gelatin. Proteins often improve moisture retention in the batter or dough and browning of the batter or dough during baking. If too much protein is present, the product may be too hard to chew and it may become extremely tough and leathery at higher moisture contents. In some embodiments, it is desired that the amount of protein, such as gluten, is limited to no more than about 10 weight percent of the total dough or batter weight.

The water in the dough or batter hydrates the solid ingredients and provides structure and texture to the product. If too much water is used, the dough or batter may be too thin to properly process, and the resulting product may have insufficient structure. Also, too much water may require an extended baking time to provide the baked good. This can provide a product that is overly porous and may cause release problems from the pan or other item which the dough or batter contacts. Conversely, too little water can provide a dough or batter that is too thick, in which the ingredients are not completely hydrated. It is understood that any aqueous solution can be used in the dough or batter. For example, fruit juice, milk, and the like can be used; such substitutions for straight water may require adjusting other ingredients in the recipe. It is preferred that the product, once baked, has a moisture content of no greater than about 5%.

Fat, in the form of solid shortening or liquid oil, is also generally included in the dough or batter. The fat tenderizes the product and facilitates removing the product from the pan or other item which contacts the dough or batter. If not enough fat is used, the dough or batter may be hard or tough, and may stick to the baking pan. Too much fat may disturb the flavor of the final baked product. Typically, the dough or batter includes no more than about 40 weight-% fat, preferably no more than about 30%.

A release agent, such as lecithin, can be used to improve processing. Other additives, such as flavorings and spices (for example, molasses, vanilla, and cinnamon) can be added, as can colorants and emulsifiers. Salt is also generally added.

The dough or batter generally is at least 10% by weight sweetener, often at least 20%. In some embodiments, 40% of the dough or batter is the sweetener. In many embodiments, once this dough or batter is converted to a: baked good (i.e, baked or cooked), the percentage of sweetener generally increases. The high molecular weight starch hydrolysate or the crystalline hydrate former are generally present in the baked product at a level of about 10 to 45%, typically about 20 to 40%.

The sweetener present in the dough or batter of the present invention includes a high molecular weight starch hydrolysate, a crystalline hydrate former, or both. As discussed above, examples of crystalline hydrate formers that can be used include trehalose, lactose, maltose, isomalt, and raffinose. Also as discussed above, examples of high molecular weight starch hydrolysates that can be used include dextrins, maltodextrin, and corn syrup solids. Examples of such materials include starch hydrolysate products having a molecular weight from about 540 to 18000. Typically, the starch hydrolysate used for the present invention has a DE of about 1 to 42, preferably of about 5 to 30, and more preferably 10 to 20.

Sugar (i.e., sucrose), which has a molecular weight of about 342, may be added to the dough or batter in addition to the high molecular weight starch hydrolysate or the crystalline hydrate former. At least 25% of the total sweetener present in the dough is a high molecular weight starch hydrolysate or crystalline hydrate former. In other embodiments, 40%, or even 60% of the total sweetener is either a high molecular weight starch hydrolysate or crystalline hydrate former. In some embodiments, it is preferred that the entire amount of sweetener is the starch hydrolysate or the crystalline hydrate former, or combination thereof.

Figure 6:
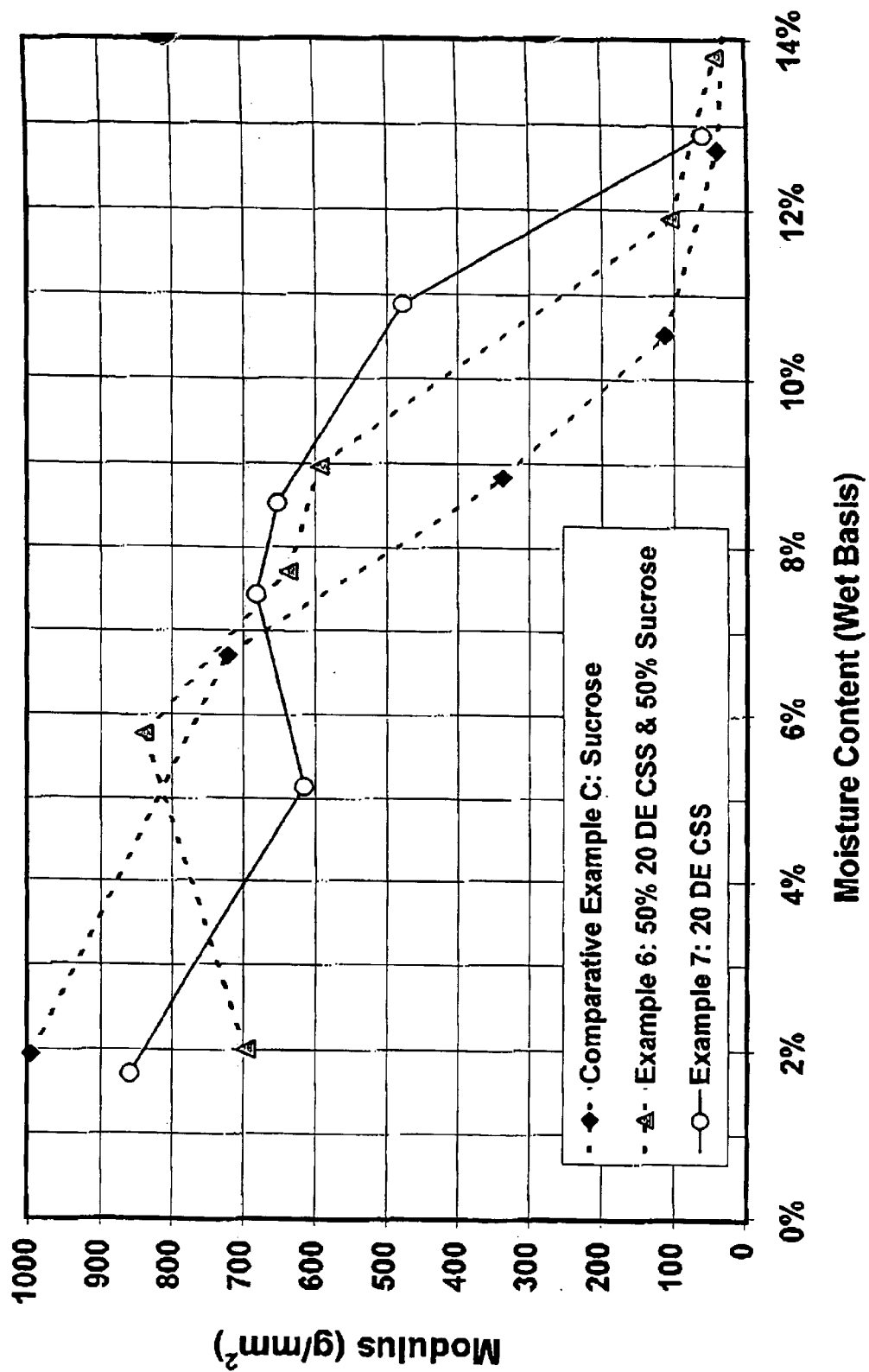
FIG. 6 is a graphical representation of the modulus of a bakery product using a proportion of starch hydrolysate products in respect to moisture content for Examples 9 through 10 and Comparative Example C.

Overall, when using starch hydrolysate products, it is the weight average molecular weight of the total sweetener component that effects the improved crispiness of the baked product. For example, less of a higher molecular weight starch hydrolysate (having a lower DE value) is needed to achieve the desired crispiness than the amount of a starch hydrolysate having a lower, yet still high, molecular weight. For example, a 50:50 mixture of 20 DE corn syrup solids:sucrose may provide similar results as a mixture of 40:60 5 DE maltodextrin: sucrose. FIG. 6 illustrates how reducing the weight average molecular weight of the total sweetener by replacing a portion of 20 DE corn syrup solids with sucrose (50% 20 DE CSS and 50% sucrose), decreases crispiness of the bakery product at higher moisture contents as quantified by the modulus of the products.

The use of the high molecular weight starch hydrolysates and crystalline hydrate formers improves the products' crispiness when exposed to moisture. Crispiness is quantified by the modulus of the product, which is the force per unit area, typically measured in grams/square millimeter, needed to break, crack, or puncture the product. Generally, as the moisture content in the food product, such as a baked dough product, increases, the modulus decreases and instead of cracking, the soggy product deforms.

Some of the products of the present invention have a high resistance to moisture while retaining crispiness due to the starch hydrolysates, which increase the molecular weight of the dough product matrix, and thus shifts the modulus in relation to the moisture content. For example, a bakery product of the present invention made with a 20 DE corn syrup solids (molecular weight of 900), having an average thickness of about 2.2 mm, has a modulus of at least about 475 g/mm$^2$ at a moisture content of 10.9%. In another embodiment, a bakery product made from a tapioca dextrin with a DE of 7–10 (molecular weight of 1800 to 2600), having an average thickness of about 2.2 mm, has a modulus of at least about 615 g/mm$^2$ at a moisture content of 10.8%. A conventional bakery product made from sucrose with a molecular weight of 340 has a modulus of only about 110 g/mm$^2$ at a moisture content of 10.5%.

The food product of the present invention is adapted for use with fillings and other food items that have a high moisture content. Frozen fillings that may be put into, on, or in contact with the food product include ice cream, ice milk, gelato, frozen yogurt, frozen custard, sherbet, sorbet, and the like. Additionally, fillings such as pudding, crèmes and pie fillings can also be used. These fillings are commonly referred to as sweet fillings or sauces. Savory fillings and sauces, such as tomato sauce, cheeses, and the like can also be used in conjunction with the food product of the present invention.

The invention will be further described and illustrated in the examples which follow. The examples are illustrative of the invention and should not be construed as limiting the scope to their details. All parts, percentages, ratios, etc. are by weight unless otherwise specified.

EXAMPLES

Various batter compositions, used for making wafers that can be rolled into various shapes, having approximately 20% sugar or sweetener, were made using the following recipe:

| Ingredient | Weight % In Batter | Weight % in Baked Product |
|---|---|---|
| Soft flour (dry basis) | 37.2 | 61.8 |
| Water | 41.0 | 2.0 |
| Sweetener | 19.8 | 32.9 |
| Shortening | 1.4 | 2.3 |
| Lecithin | 0.3 | 0.5 |
| Salt | 0.3 | 0.5 |

The sweetener used with the various recipes was as follows:

| | |
|---|---|
| Comparative Example A | Sucrose |
| Comparative Example B | Sucrose |
| Comparative Example C | Sucrose |
| Example 1 | Trehalose |
| Example 2 | Raffinose |
| Example 3 | 5 DE Maltodextrin |
| Example 4 | 10 DE Maltodextrin |
| Example 5 | Tapioca Dextrin (K4484*) |
| Example 6 | 50% 20 DE CSS & 50% Sucrose |
| Example 7 | 20 DE Corn Syrup Solids |

*K4484 Tapioca Dextrin is a hydrolyzed starch product from National Starch and Chemical Company, 10 Finderne Avenue, Bridgewater, New Jersey.

The bakery products produced for the above examples were made by a lab bench process. The bakery products were prepared by first weighing the ingredients. The lecithin was stirred into the shortening and then heated in a microwave oven to soften the shortening. The dry ingredients were blended together in a mixing bowl, and the water and shortening/lecithin mixture were stirred into the dry mix. Using an electric mixer (commercially available as Hobart Mixer #N-50 from Hobart Corporation of Troy, Ohio), the batter was mixed on low speed for 30 seconds. The sides of the bowl were scraped and then mixed on medium speed for 30 additional seconds.

Approximately twenty grams of the batter were poured onto a hot wafer iron (commercially available as Krumkake Baker No. 350, made by Vitantonio Manufacturing Company of Eastlake, Ohio) which had been warmed for 15 minutes before using. The batter was baked between 1 minute 20 seconds and 1 minute 30 seconds, after which a baked wafer was removed. The resulting circular wafer was approximately 4 inches (about 11 cm) in diameter with a thickness of about 2.2 mm. with a coefficient of variation of 9.6%. The thickness was measured with the continuous recessed portion of the wafer and not with the ridged-design portion of the wafer. (The coefficient of variation is the ratio of the standard deviation over the mean expressed as a percentage.) It was noted that as the molecular weight of the sweetener was decreased (i.e., as the DE increased), there was less of a tendency for the wafer to brown during cooking.

The wafer was cooled for approximately 3 minutes and then the weight loss was determined. The weight loss target was 40 to 41%, and the bake time was adjusted to meet this target. The iron was allowed to rest 30 seconds before adding another batch of batter.

The wafers were stored in a 4 mil thick HDPE (high density polyethylene) bag and allowed to equilibrate before being tested for moisture content. The moisture content of each wafer was tested by determining the loss of weight upon drying. In particular, each wafer was dried in a 70° C. vacuum oven for 16 hours to remove the moisture, and then the amount of weight loss was calculated. This weight loss was attributed to the moisture initially in the wafer. Generally, the amount of initial moisture in the wafers was about 2%.

A single layer of wafers was placed in a 70% relative humidity chamber at 72° F. (about 22° C.). The wafers were left exposed for 0, 1, 2, 3, 5 and 24 hours and then were heat sealed in 2.5 mil thick metallized polyester pouches. The wafers were allowed to equilibrate in the package for at least 5 days before being analyzed for texture. The moisture content of the wafers was calculated using the initial moisture content and the amount of weight gained after exposure to the humidity.

To determine the modulus of the wafer, the wafer texture was analyzed with a puncture test using an Instron Universal Testing Machine (Model 1011) in the compression mode. The 11 cm wafer was placed on a cylinder having a 2.43 cm diameter support hole. A 6.35 mm diameter, flat metal probe was used to puncture the wafers at a crosshead speed of 10 mm/minute. Three wafers at each moisture level, with two holes per wafer, were punched. The average modulus of the six data points with an average coefficient of variation of 25%, at each moisture content, is listed in Table 1 below and shown graphically in FIGS. 4, 5 and 6. The quantitative data provided in Table 1 were estimated from FIGS. 4, 5 and 6.

TABLE 1

Modulus (g/mm²) in Wafers at Different Moisture Contents

| Example | Moisture Content (wet basis) | | | | | | | | | |
|---|---|---|---|---|---|---|---|---|---|---|
| | 2% | 4% | 6% | 8% | 9% | 10% | 11% | 12% | 13% | 14% |
| Comparative A, B, & C | 995 | 880 | 760 | 480 | 320 | 160 | 95 | 60 | 35 | 30 |
| 1 | 1000 | 850 | 705 | 780 | 700 | 460 | 320 | 220 | 250 | 340 |
| 2 | 710 | 600 | 545 | 380 | 340 | 300 | 270 | 250 | 270 | 370 |
| 3 | 630 | 630 | 620 | 615 | 580 | 530 | 430 | 280 | 125 | 75 |
| 4 | 760 | 635 | 565 | 635 | 640 | 515 | 395 | 260 | 125 | — |
| 5 | 530 | 505 | 465 | 405 | 415 | 630 | 570 | 345 | 210 | 130 |
| 6 | 696 | 770 | 820 | 630 | 585 | 420 | 260 | 100 | 65 | — |
| 7 | 840 | 700 | 640 | 670 | 620 | 540 | 460 | 240 | 55 | — |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A frozen food product, comprising; at least one unleavened baked wafer, wherein the baked wafer is molded into a desired shape prior to baking having opposed major surfaces, a thickness, and a moisture content no greater than about 5%, fabricated from a dough or batter composition, comprising: flour, water and a sweetener, wherein the sweetener consists of sucrose, and at least 40% of a member of the group consisting of a high molecular weight starch hydrolysate having a DE of 1 to 20 or a crystalline hydrate former, wherein the crystalline hydrate former is selected from the group consisting of maltose, trehalose, isomalt, and raffinose, and mixtures thereof; having a modulus of at least 200 g/mm² at a moisture content of 9%; and a frozen dessert composition in contact with at least one major wafer surface.

2. The frozen food product of claim 1, wherein the baked wafer has a modulus of at least 300 g/mm² at a moisture content of 9%.

3. The frozen food product of claim 1, wherein the sweetener of the baked wafer consists of at least one of the high molecular weight starch hydrolysate and the crystalline hydrate former.

4. The frozen food product of claim 1, wherein the high molecular weight starch hydrolysate of the baked wafer is corn syrup solids having a DE of 1 to 20.

5. The frozen food product of claim 1, wherein the baked wafer has a modulus of at least 350 g/mm² at a moisture content of 10%.

6. The frozen food product of claim 1, wherein the frozen dessert composition is selected from the group consisting of ice cream, ice milk, gelato, frozen yogurt, sorbet, frozen custard, and sherbet.

7. The frozen food product of claim 1, wherein the baked wafer is in the form of a cone.

8. The frozen food product of claim 1, wherein the baked wafer is in the form of a flat wafer.

9. The flat wafer frozen food product of claim 8, wherein the baked wafer is in the form of a cookie.

10. The frozen food product of claim 1, wherein the baked wafer is in the form of a molded cup.

11. The frozen food product of claim 1, wherein the baked wafer is in the form of a cylinder forming a shell.

12. The frozen food product of claim 6, wherein the baked wafer is mixed throughout the frozen dessert composition.

13. The frozen food product of claim 1, wherein the baked wafer additionally comprises lecithin, salt, and shortening.

* * * * *

UNITED STATES PATENT AND TRADEMARK OFFICE
CERTIFICATE OF CORRECTION

PATENT NO. : 6,824,799 B1
DATED : November 30, 2004
INVENTOR(S) : Huang et al.

It is certified that error appears in the above-identified patent and that said Letters Patent is hereby corrected as shown below:

Column 10,
Line 32, "flat wafer frozen food product" should be -- frozen food product --

Signed and Sealed this

Nineteenth Day of April, 2005

JON W. DUDAS
*Director of the United States Patent and Trademark Office*